(12) United States Patent
Shao et al.

(10) Patent No.: US 12,232,493 B2
(45) Date of Patent: Feb. 25, 2025

(54) BIOPESTICIDE FORMULATION AND TREATMENT METHOD THEREOF

(71) Applicant: Xinjiang Institute of Ecology and Geography, Chinese Academy of Sciences, Urumqi (CN)

(72) Inventors: Hua Shao, Urumqi (CN); Lijing Lei, Urumqi (CN); Wei Shao, Linyi (CN); Chi Zhang, Linyi (CN)

(73) Assignee: XINJIANG INSTITUTE OF ECOLOGY AND GEOGRAPHY, CHINESE ACADEMY OF SCIENCES, Urumqi (CN)

( * ) Notice: Subject to any disclaimer, the term of this patent is extended or adjusted under 35 U.S.C. 154(b) by 0 days.

(21) Appl. No.: 18/219,277

(22) Filed: Jul. 7, 2023

(65) Prior Publication Data
US 2024/0032536 A1   Feb. 1, 2024

(51) Int. Cl.
*A01N 35/06* (2006.01)
*A01G 7/06* (2006.01)
*A01G 22/15* (2018.01)
*A01G 22/20* (2018.01)
*A01G 22/40* (2018.01)
*A01P 21/00* (2006.01)

(52) U.S. Cl.
CPC ............... *A01N 35/06* (2013.01); *A01G 7/06* (2013.01); *A01G 22/15* (2018.02); *A01G 22/20* (2018.02); *A01G 22/40* (2018.02); *A01P 21/00* (2021.08)

(58) Field of Classification Search
CPC .......... A01N 35/06; A01G 7/06; A01G 22/15; A01G 22/20; A01G 22/40; A01P 21/00
See application file for complete search history.

(56) References Cited

U.S. PATENT DOCUMENTS

| 2007/0128136 A1 | 6/2007 | Yoo | |
|---|---|---|---|
| 2011/0105442 A2 * | 5/2011 | Dechert | A61P 17/10 514/588 |
| 2020/0121575 A1 * | 4/2020 | Baptiste | A61K 36/9068 |

FOREIGN PATENT DOCUMENTS

| CN | 104893986 A | 9/2015 |
|---|---|---|
| CN | 113846126 A | 12/2021 |

OTHER PUBLICATIONS

C. Zaehle et al., "Terrein Biosynthesis in Aspergillus terreus and Its Impact on Phytotoxicity," Chemistry & Biology 21, 719-731, Jun. 19, 2014.*
S. Kamata et al., "Isolation of Acetylaranotin, Bisdethiodi(ethylthio)-acetylaranotin and Terrein as Plant Growth INhibitors fro ma Strain of Aspergillus terreus," Agric. Biol. Chem., 47(11), 2637-2638, 1983.*
Gressler et al. "Phytotoxin production in Aspergillus terreus is regulated by independent environmental signals", Jul. 14, 2015, eLIFE.

* cited by examiner

*Primary Examiner* — Monica A Shin
(74) *Attorney, Agent, or Firm* — WPAT, PC (57) ABSTRACT

The present disclosure is related to terrein functioning as a biopesticide formulation in drought resistance and growth promotion of crops. The formulation containing terrein can be treated by soaking or spraying on the crops. It is especially suitable for drought and water shortage conditions, promoting growth of plant root length, seedling height, fresh weight, and dry weight, greatly increasing crop yield, and significantly improving drought resistance of crop plants. Under the condition of seed soaking treatment with 10 μg/mL terrein, promotion rates of root length, seedling height, fresh weight, and dry weight of pakchoi are 99.19%, 15.66%, 40.34%, and 49.12%, respectively. The source of terrein is easy to obtain and the cost is low. It has a simple structure and is easily soluble in water. In the actual application process, it only needs to simply prepare an aqueous solution or mix with other pesticide formulations for seed soaking or spraying treatment.

4 Claims, 5 Drawing Sheets

BIOPESTICIDE FORMULATION AND TREATMENT METHOD THEREOF

CROSS-REFERENCE TO RELATED APPLICATION

This application claims priority to Chinese Patent Applications No. CN202210880877.9 filed on 2022 Jul. 26, which is hereby incorporated by reference in its entirety.

BACKGROUND

Technical Field

The present invention belongs to technical field of biopesticides, and relates to a biopesticide formulation of terrein in drought resistance and growth promotion of crops and a treatment method thereof.

Related Art

Abiotic stress is one of the major constraints to crop production and food security worldwide. With the global climate anomalies and the destruction of ecological balance, water shortage has become a serious ecological problem faced by all mankind Drought stress can have adverse effects on plant growth, including physical damage, changes in physiological, biochemical, and molecular levels, which seriously restrict development of agricultural production. China, as a large country of population and agriculture, food security is directly related to the people's livelihood, the key to promoting stable economic development and building a harmonious society, has been given high attention. In order to ensure the healthy growth of crops, the use of chemical pesticides is essential, however, it will inevitably pollute the soil, water, and the atmosphere, thus endangering the health of humans and animals. New high-efficiency biopesticides have characteristics of low toxicity and environmental friendliness, and are increasingly being developed and applied to crops. As an important resource to replace chemical pesticides, it can play an important role in quality and safety of agricultural products, ecological environment safety, pest prevention and control, and other aspects. Biopesticides include microbial pesticides, biochemical pesticides, and botanical pesticides. The state encourages the development of biopesticides, as shown in Zhang Hongjun, Tao Lingmei, Liu Xue, et al. Review on Registration and Management of Bio-pesticide in China [J]. Chinese Journal of Biological Control, 2022, 38(01): 9-17 shows that as of November 2021, species (122 species, accounting for 16% of all registered pesticide species) and production number (1449, accounting for 3.4% of the total number of pesticide products) of effective registered biopesticides in China is relatively limited, and it is urgent for researchers to study more biopesticides that are beneficial to crops.

SUMMARY

It is noted that the present disclosure includes one or more inventive solutions currently claimed or not claimed, and in order to avoid confusion between the illustration of these embodiments in the specification, a number of possible inventive aspects herein may be collectively referred to "present/the invention."

In view of the aforementioned, an object of the present invention is to provide a new application of terrein in drought resistance and growth promotion of crops, to provide a new idea of biopesticides, and also to a method for dealing with drought resistance and growth promotion of crops.

In order to achieve the above purpose, the present invention provides following technical solutions.

A biopesticide formulation includes terrein used as an active ingredient to make crops resistant to drought and promote growth.

Further, in the application of terrein as a biopesticide formulation in drought resistance and growth promotion of crops, the treatment method is to soak or spray the formulations containing terrein on the crops.

Further, in the application of terrein as the biopesticide formulation in drought resistance and growth promotion of crops, the crops includes pakchoi, mung bean, sorghum, or wheat.

Further, in the application of terrein as the biopesticide formulation in drought resistance and growth promotion of crops, an applied concentration of terrein ranges from 2 µg/mL to 10 µg/mL.

Terrein is prepared with distilled water to the concentration of 0 µg/mL, 2 µg/mL, and 10 µg/mL, and the seeds of pakchoi, mung bean, sorghum, and wheat were sown and planted after soaking. When the concentration of terrein is 2 µg/mL, it can significantly promote the growth of pakchoi, mung bean, and wheat. When the concentration of terrein is 10 µg/mL, the promoting effect on the growth of pakchoi, mung bean, sorghum, and wheat is further enhanced.

Using distilled water to prepare terrein at the concentration of 0 µg/mL, 2 µg/mL, and 10 µg/mL, spraying four kinds of crops of pakchoi, mung bean, sorghum, and wheat at their seedling stage. When the concentration of terrein is 2 µg/mL, it also shows a significant promoting effect on the growth of pakchoi, mung bean, sorghum, and wheat. When the concentration of terrein is 10 µg/mL, the growth-promoting effect on mung bean, sorghum, and wheat is further enhanced, and the growth-promoting effect is better than that of seed soaking treatment.

A treatment method for drought resistance and growth promotion of crops is also provided, that is, the crops are treated by a seed soaking treatment or a spraying treatment with a formulation containing terrein.

Further, in the treatment method for drought resistance and growth promotion of crops, the crops includes pakchoi, mung bean, sorghum, or wheat.

Further, in the treatment method for drought resistance and growth promotion of crops, the seed soaking treatment specifically includes soaking the seeds of the crops in a formulation containing 2 µg/mL to 10 µg/mL terrein for 2 to 8 hours, and then the seeds are sown in the soil.

Further, in the treatment method for drought resistance and growth promotion of crops, the seed soaking treatment specifically includes soaking the seeds of the crops in a formulation containing 2 µg/mL to 10 µg/mL terrein for 6 hours, and then the seeds are sown in the soil.

Further, in the treatment method for drought resistance and growth promotion of crops, the spraying treatment comprises spraying the formulation containing 2 µg/mL to 10 µg/mL terrein at the seedling stage of the crops by 1 to 3 times.

Preferably, a formulation of 10 µg/mL terrein can be used to soak the seeds to increase the yield of pakchoi.

Preferably, a formulation of 10 µg/mL terrein can be used for spraying treatment to increase the yield of mung bean, sorghum, or wheat.

The beneficial effects of the present invention are as following. The invention provides a new use of terrein as a biopesticide formulation, which is suitable for planting crops after soaking seeds or spraying their seedlings under conditions of drought and water shortage, so as to promote the growth of plant root length, seedling height, fresh weight, and dry weight, greatly increase crop yield, and significantly improve the drought resistance of crop plants. The compound terrein is a natural product, which can be degraded in nature, has little environmental pollution, and can be applied to the cultivation of crops such as pakchoi, mung bean, sorghum, and wheat. In addition, terrein can be extracted from the fungus Aspergillus terreus, and can also be artificially chemically synthesized. The source is easy to obtain and the cost is low. Moreover, terrein has a simple structure and is easily soluble in water. In the actual application process, it only needs to simply prepare an aqueous solution or mix with other pesticide formulations for seed soaking or spraying treatment. The operation is very simple and has strong practicability, especially for the agricultural industry in arid or water-scarce areas, which can exert great application value.

The compound terrein provided by the present invention has a significant growth-promoting effect on four crops of pakchoi, mung bean, sorghum, and wheat under drought conditions after seed soaking treatment with 2 μg/mL to 10 μg/mL, especially when the concentration is 10 μg/mL, its effect is better than the seed soaking treatment with 2 μg/mL. The promotion rates of root length, seedling height, fresh weight, and dry weight of pakchoi are 99.19%, 15.66%, 40.34%, and 49.12%, respectively. It can also be sprayed with 2 μg/mL to 10 μg/mL terrein, which has a significant promotive effect on mung bean, sorghum, and wheat seedlings, especially when the concentration is 10 μg/mL, the promotion rates of root length, fresh weight, and dry weight of mung bean are 57.20%, 56.18%, and 26.98%, respectively. The promotion rates of root length, fresh weight, and dry weight of sorghum are 30.50%, 19.90%, and 25.19%, respectively. The promotion rates of root length, fresh weight, and dry weight of wheat are 67.40%, 97.21%, and 34.79% respectively.

Various other objects, advantages and features of the present invention will become readily apparent from the ensuing detailed description, and the novel features will be particularly pointed out in the appended claims.

BRIEF DESCRIPTION OF THE DRAWINGS

The disclosure will become more fully understood from the detailed description given herein below for illustration only, and thus not limitative of the disclosure, wherein.

DETAILED DESCRIPTION

The preferred embodiments of the present invention will be described in detail below with reference to the accompanying drawings. For the experimental methods that do not specify specific conditions in the embodiments, usually follow conventional conditions or conditions suggested by the manufacturer.

Terrein, is one of the main secondary metabolites produced by the soil fungus Aspergillus terreus, with a CAS number of 582-46-7. It is a colorless needle-like crystal at room temperature. It is a small molecule polyketide compound with a simple structure, which has various biological activities, including anticancer, anti-inflammatory, antibacterial, insecticidal, etc., and has potential application prospects in the fields of beauty, medicine, and agriculture. However, there is no report about the drought resistance and growth promoting effect of terrein on plants at home and abroad. Terrein has a simple structure. It can not only be fermented and extracted by Aspergillus terreus strains widely present in the soil, with high yield and high purity, but also can be prepared on a large scale by chemical synthesis. The source is easy to obtain, and it has a good prospect for development and utilization.

The structural formula of the terrein involved is:

Soil moisture content calculation formula:

$$\text{Soil moisture content} = \frac{\text{original soil weight} - \text{dried soil weight}}{\text{dried soil weight}} \times 100\%$$

In Zhang Dan's "Regional Drought Long-Term Forecasting and Agricultural Drought Risk Comprehensive Assessment [D]. Dalian University of Technology, 2011", taking the average moisture content of each layer in each period from 2002 to 2009 at Chaoyang Station in the western part of Liaoning Province as an example, when it is in a drought year (2009), the rainfall from mid-April to early November is only 267 mm, and the highest and lowest average moisture content of the 0-50 cm soil layer are 18.8% and 8.3%, respectively, and the average soil moisture content during this period is 12.9%. When it is in a wet year (2003), the rainfall in the same period is 514 mm, and the highest and lowest average moisture content of the 0-50 cm soil layer are 24.5% and 10.7%, respectively, and the average soil moisture content during this period is 15.7%.

In addition, soil moisture can be classified into saturated moisture, suitable moisture, yellow moisture and dry soil. Wherein, (1) Saturated moisture (moisture content ranges from 18.5% to 20%), the soil color is dark and black, it can be kneaded into a ball by hand, and it will not disperse by throwing it. It can be twisted into strips. There are obvious water marks on the hands. The saturated moisture is the upper limit of suitable tillage, and the effective moisture content of the soil is the largest. (2) Suitable moisture (moisture content ranges from 15.5% to 18.5%), the soil color is deep and dark, it can be kneaded into a ball by hand, and will be broken when thrown. There are wet marks on the hands. Suitable moisture content is suitable for sowing cultivation, and the effective moisture content is relatively high. (3) Yellow soil (moisture content ranges from 12% to 15%), the soil color is yellow, it can be kneaded into a ball, crumbly, and has a cool feeling in the hand. The yellow soil is suitable for cultivation, the effective moisture content is less, and the emergence of seedlings is uneven, so irrigation is required. (4) Dry soil (moisture content below 8%), the soil color is grayish white, with large lumps of induration, fine soil is loose, and dry soil has no moisture that crops can absorb, so it is not suitable for cultivating and sowing. In the present invention, the soil moisture content of the normal treatment group is 18.33% to 19.67%, which is between suitable moisture and saturated moisture, while the soil moisture content of the drought treatment group is 9.33% to 11.89%, which is between dry soil and yellow moisture.

First Embodiment

An embodiment of effects of 2 µg/mL terrein formulation on the growth of four crops by seed soaking treatment under drought conditions is as follows. Terrein (purity 95%) is prepared as a solution with a concentration of 2 µg/mL in distilled water, and pakchoi, mung bean, sorghum, and wheat seeds are soaked in it for 6 hours, and the seeds are also soaked in distilled water as a blank control. Subsequently, the soaked crop seeds are sown into potted plants, and each of the treatment group is replicated five times. When the seedlings grew to about 10 cm, the drought treatment culture is carried out. The room temperature is 25° C., the humidity is 70%, 12 hours of light and 12 hours of darkness each day, and the light intensity is 80-100 µmol·m$^{-2}$·s$^{-1}$. During the period, the soil was kept in a dry state, and 200 mL is watered every week for 30 days, with a total of 800 mL. It is detected that the moisture content of each soil is maintained at 9.33% to 11.89%, as shown in Table 2. The drought culture conditions described below are all treated in the same way. After 30 days, the root length, seedling height, and fresh weight of pakchoi, mung bean, sorghum, and wheat are measured, and 10 seedlings are selected from each of the treatment groups, with a total of 50 plants (N=50), hereafter, they are dried in an oven and then measured dry weight.

Data statistics method is as follows. The growth rates of root length, seedling height, fresh weight, and dry weight of pakchoi, mung bean, sorghum, and wheat under 2 µg/mL compared to the blank control are first calculated, that is, $$\text{growth rate} = \frac{\text{treatment} - \text{blank control}}{\text{blank control}}$$

Then use one-way analysis of variance to detect whether the difference between the data of each of groups is significant, and then use the One-way analysis of variance (One-way ANOVA) method to analyze the data, and the difference between the groups with different marked letters is significant, where the level of probability value is p<0.05.

Results are as follows. Under the soaking treatment of 2 µg/mL terrein, compared with the blank control, the growth rates of the root length of dicotyledonous pakchoi and mung bean are 76.63% and 44.72%, respectively, and the growth rates of their dry weight are 32.47% and 28.07%, respectively, the effects on seedling height, and fresh weight are not significant. In addition, the promotion rates of wheat fresh weight and dry weight are 52.30% and 21.99%, respectively, and there is no significant effect on the growth of sorghum. It can be seen that the seed soaking treatment at this concentration is more suitable for increasing the yield of dicotyledonous pakchoi and mung bean compared with monocotyledonous sorghum and wheat.

Second Embodiment

An embodiment of effects of 10 µg/mL terrein formulation on the growth of four crops by seed soaking treatment under drought conditions is as follows. Terrein is prepared as a solution with a concentration of 10 µg/mL in distilled water, and pakchoi, mung bean, sorghum, and wheat seeds are soaked in it for 6 hours, and the seeds are also soaked in distilled water as a blank control. Subsequently, the soaked crop seeds are sown into potted plants. When the seedlings grew to about 10 cm, the drought treatment culture is carried out. After 30 days, the root length, seedling height, and fresh weight of pakchoi, mung bean, sorghum, and wheat are measured, hereafter, they are dried in an oven and then measured dry weight.

Data statistics method is as follows. The growth rates of root length, seedling height, fresh weight, and dry weight of pakchoi, mung bean, sorghum, and wheat under 10 µg/mL compared to the blank control are first calculated, that is, $$\text{growth rate} = \frac{\text{treatment} - \text{blank control}}{\text{blank control}}$$

Then use One-way ANOVA to detect whether the difference between the data of each of groups is significant, and the difference between the groups with different marked letters is significant, where the level of probability value is p<0.05.

Results are as follows. Under the soaking treatment of 10 µg/mL terrein, terrein had a significant promoting effect on the growth of pakchoi, mung bean, sorghum, and wheat, and the effect strength is better than that of 2 µg/mL seed soaking treatment. Compared with the blank control, the growth rates of the root length of pakchoi, mung bean, and wheat are 99.19%, 30.92%, and 25.09%, respectively. The growth rate of seedling height of pakchoi is 15.66%. The growth rates of fresh weight of pakchoi and wheat are 40.34% and 76.39%, respectively. The growth rates of dry weight of pakchoi, mung bean, sorghum, and wheat are 49.12%, 35.65%, 15.42% and 22.35%, respectively. It can be seen that compared with the seed soaking treatment of 2 µg/mL, the growth of pakchoi can be further promoted under the condition of seed soaking treatment at this concentration, and it is more suitable as a drought-resistant and growth-promoting agent for pakchoi to increase its yield. At the same time, it can also be applied to increase the yield of mung bean, sorghum, and wheat, but the effect is weaker than that of pakchoi.

Third Embodiment

An embodiment of effects of 2 µg/mL terrein formulation on the growth of four crops by spraying treatment under drought conditions is as follows. Seeds of four tested plants are soaked in distilled water and then sowing. Terrein is prepared as a solution with a concentration of 2 µg/mL in distilled water. When the potted pakchoi, mung bean, sorghum, and wheat grow to about 10 cm (15-20 days after sowing), spray them once, with an amount of about 3 mL, and distilled water sprayed used as blank control. Subsequently, the drought treatment culture is carried out. The room temperature is 25° C., the humidity is 70%, 12 hours of light and 12 hours of darkness each day, and the light intensity is 80-100 µmol·m$^{-2}$·s$^{-1}$. During the period, the soil was kept in a dry state, and 200 mL is watered every week for 30 days, with a total of 800 mL. It is detected that the moisture content of each soil is maintained at 9.33% to 11.89%, as shown in Table 2. After 30 days, the root length, seedling height, and fresh weight of pakchoi, mung bean, sorghum, and wheat are measured, hereafter, they are dried in an oven and then measured dry weight.

Data statistics method is as follows. The growth rates of root length, seedling height, fresh weight, and dry weight of pakchoi, mung bean, sorghum, and wheat under 2 µg/mL compared to the blank control are first calculated, that is, $$\text{growth rate} = \frac{\text{treatment} - \text{blank control}}{\text{blank control}}$$

Then use One-way ANOVA to detect whether the difference between the data of each of groups is significant, and the difference between the groups with different marked letters is significant, where the level of probability value is $p<0.05$.

Results are as follows. Under the spraying treatment of 2 µg/mL terrein, compared with the blank control, the growth rates of the root length of pakchoi, mung bean, and sorghum are 32.48%, 61.95%, and 18.49%, respectively. The growth rates of fresh weight of sorghum and wheat are 18.92% and 60.98%, respectively. The growth rates of dry weight of sorghum and wheat are 20.80% and 16.29%, respectively. Compared with the seed soaking treatment, the growth-promoting effect on pakchoi under this condition is slightly weaker, but the growth-promoting effect on mung bean, sorghum, and wheat is slightly stronger, and it can be applied to increase the yield of mung bean, sorghum, and wheat.

Fourth Embodiment

An embodiment of effects of 10 µg/mL terrein formulation on the growth of four crops by spraying treatment under drought conditions is as follows. Seeds of four tested plants are soaked in distilled water and then sowing. Terrein is prepared as a solution with a concentration of 10 µg/mL in distilled water. When the potted pakchoi, mung bean, sorghum, and wheat grow to about 10 cm (15-20 days after sowing), spray them once, with an amount of about 3 mL, and distilled water sprayed used as blank control. Subsequently, the drought treatment is carried out. After 30 days, the root length, seedling height, and fresh weight of pakchoi, mung bean, sorghum, and wheat are measured, hereafter, they are dried in an oven and then measured dry weight.

Data statistics method is as follows. The growth rates of root length, seedling height, fresh weight, and dry weight of pakchoi, mung bean, sorghum, and wheat under 10 µg/mL compared to the blank control are first calculated, that is, $$\text{growth rate} = \frac{\text{treatment} - \text{blank control}}{\text{blank control}}$$

Then use One-way ANOVA to detect whether the difference between the data of each of groups is significant, and then use the LSD method to analyze the data, and the difference between the groups with different marked letters is significant, where the level of probability value is $p<0.05$.

Figure 1:
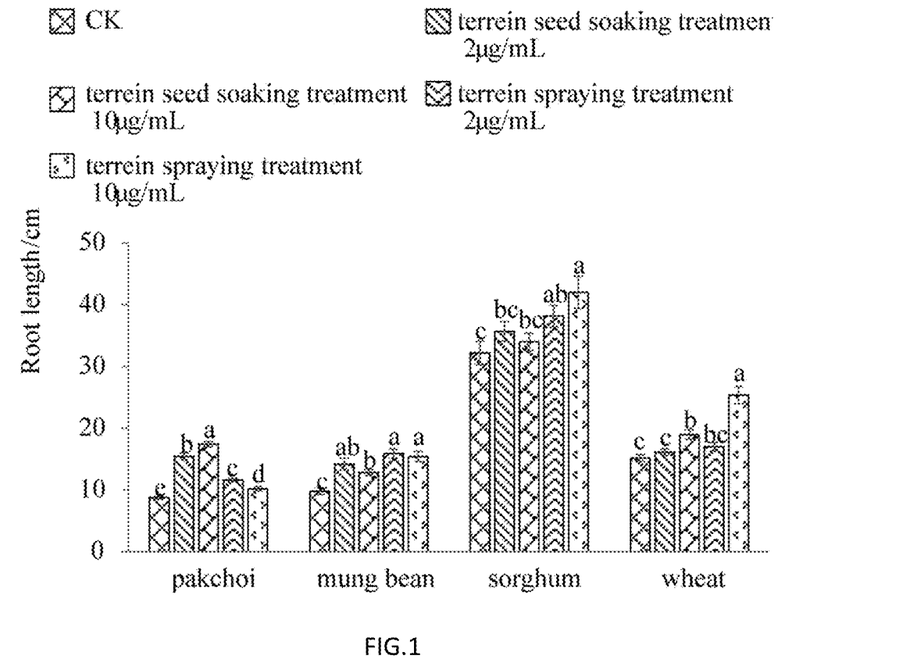
FIG. 1 shows the effect of terrein on root growth of four potted crops under different treatments according to the present invention.
Figure 2:
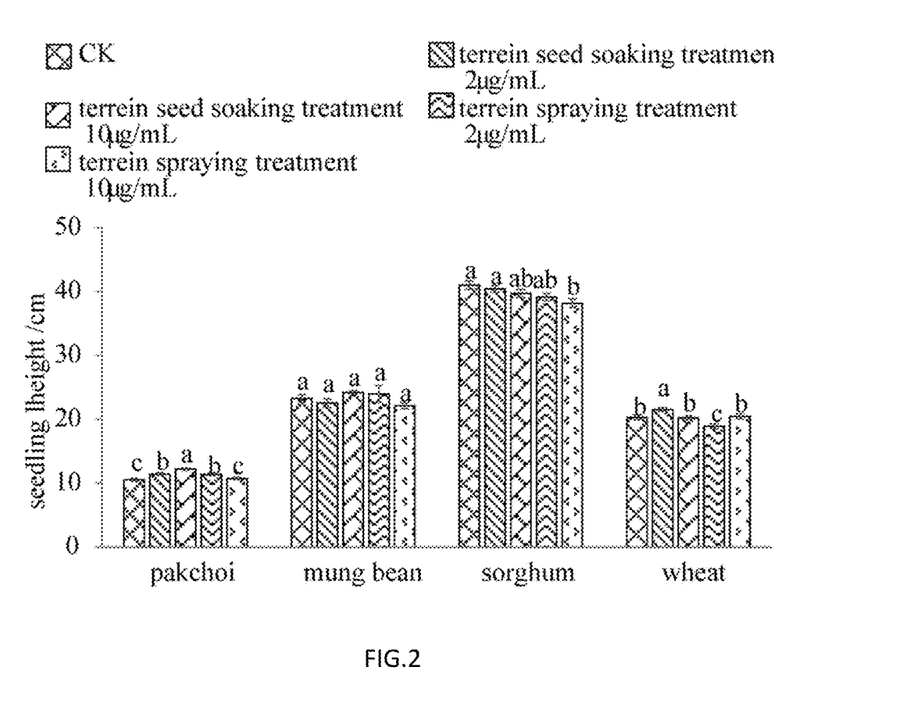
FIG. 2 shows the effect of terrein on growth of seedling height of four potted crops under different treatments according to the present invention.
Figure 3:
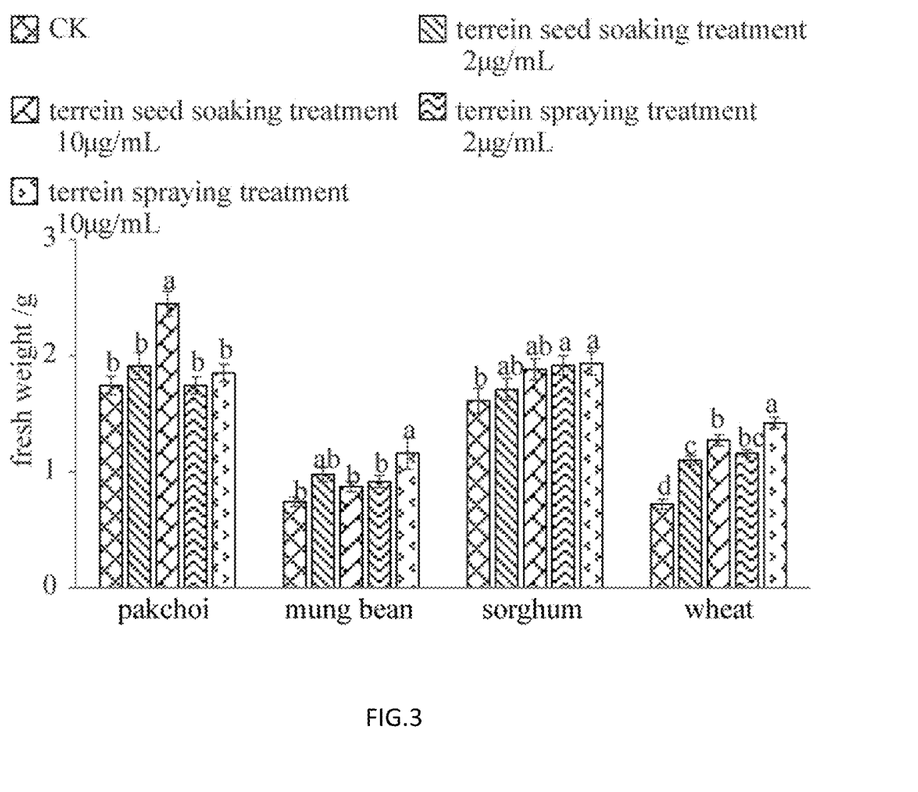
FIG. 3 shows the effect of terrein on fresh weight of four potted crops under different treatments according to the present invention.
Figure 4:
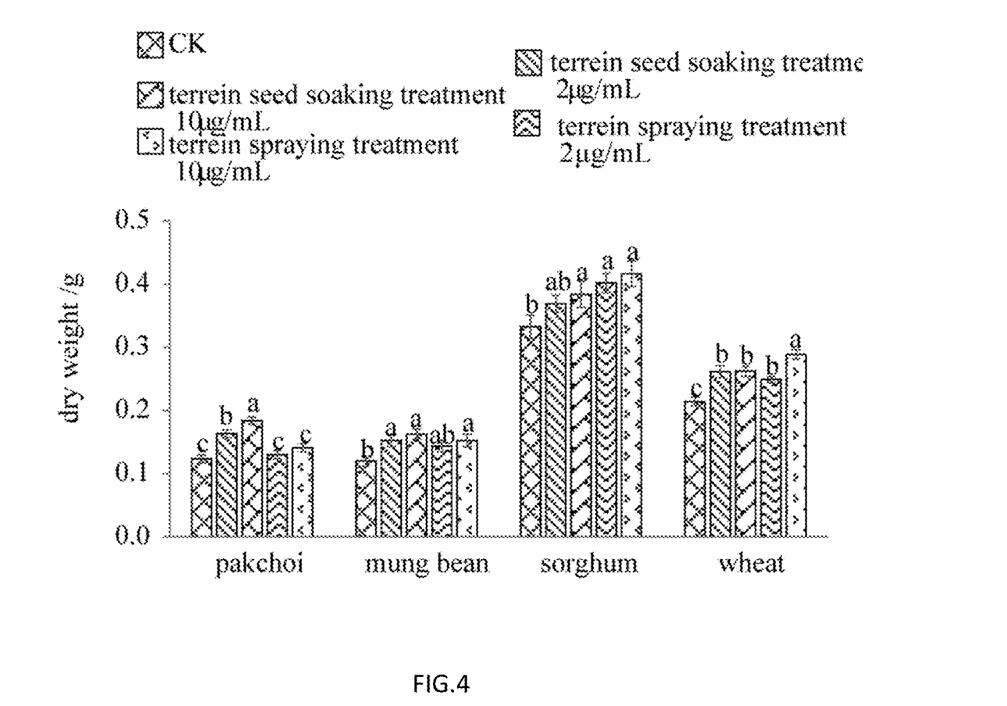
FIG. 4 shows the effect of terrein on dry weight of four potted crops under different treatments according to the present invention.
Figure 5:
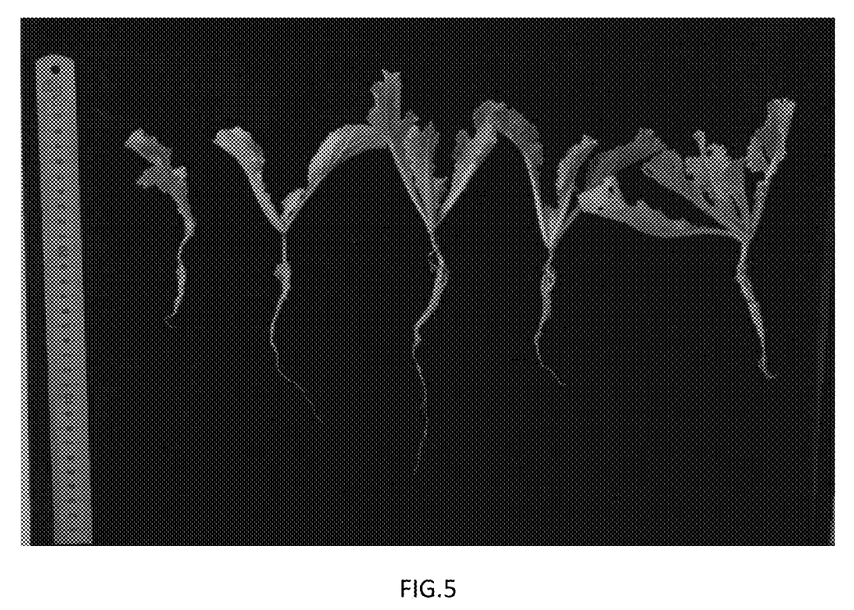
FIG. 5 shows the effect of terrein on growth of pakchoi under different treatments according to the present invention.
Figure 6:
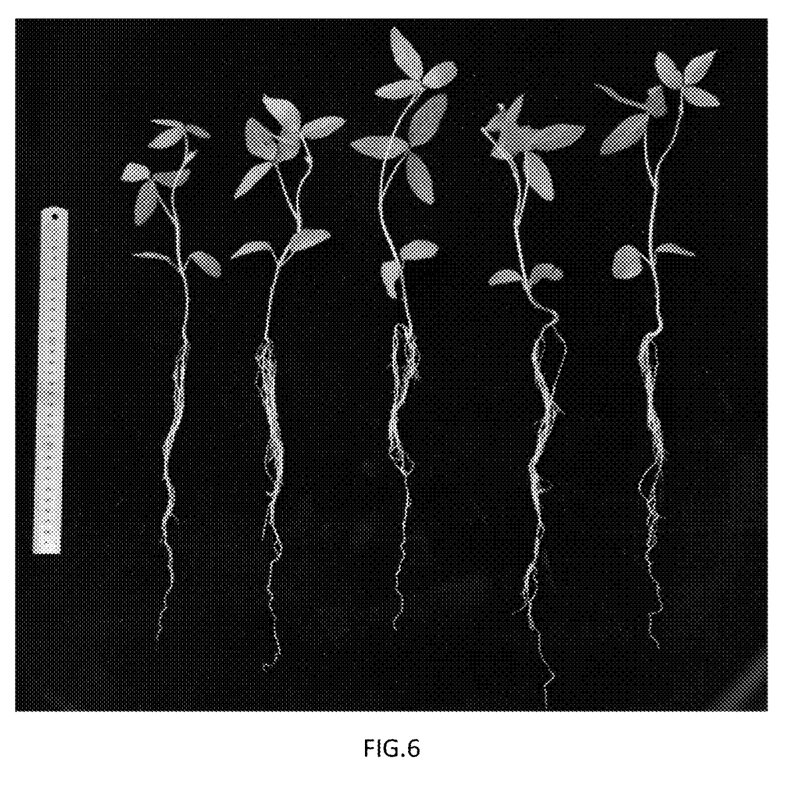
FIG. 6 shows the effect of terrein on growth of mung bean under different treatments according to the present invention.
Figure 7:
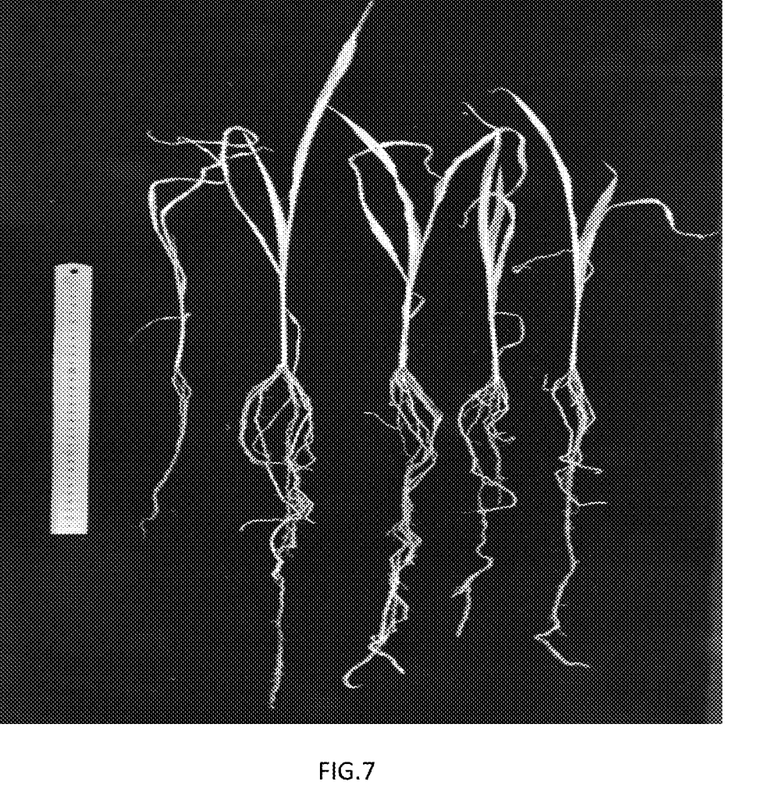
FIG. 7 shows the effect of terrein on growth of sorghum under different treatments according to the present invention.
Figure 8:
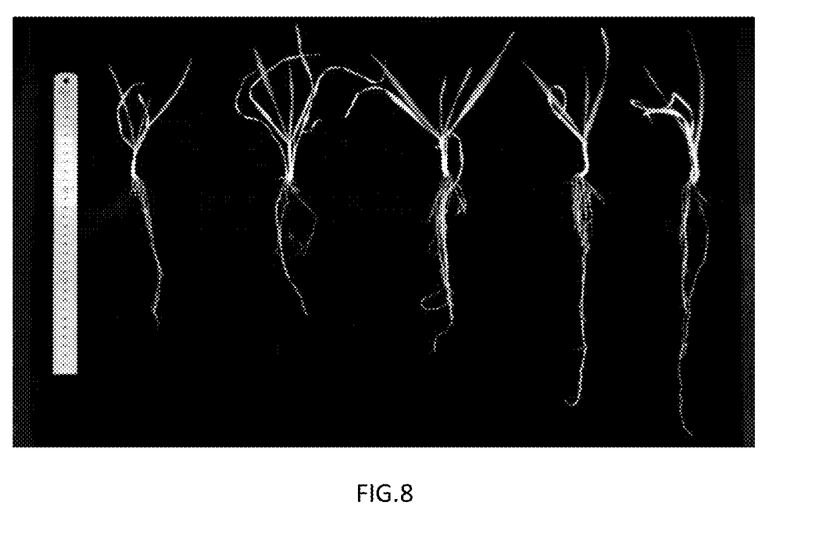
FIG. 8 shows the effect of terrein on growth of wheat under different treatments according to the present invention.

Results are as follows. Under the spraying treatment of 10 µg/mL terrein, pakchoi, mung bean, sorghum and wheat showed significant promoting effects. Compared with the blank control, the growth rates of root length are 16.45%, 57.20%, 30.50% and 67.40%, respectively. The growth rates of fresh weight of mung bean, sorghum and wheat are 56.18%, 19.90% and 97.21%, respectively. The growth rates of dry weight of mung beans, sorghum and wheat are 26.98%, 25.19% and 34.79%, respectively. Compared with other groups of treatment, this condition has a slightly weaker growth-promoting effect on pakchoi, but has the strongest growth-promoting effect on mung bean, sorghum and wheat, so the treatment is more suitable as a drought-resistant growth-promoting agent for mung bean, sorghum and wheat to increase their yield. The test results of first embodiment to fourth embodiment are shown in FIG. 1 to FIG. 8, wherein FIG. 1 shows the effect of terrein on root growth of four potted crops under different treatments according to the present invention. FIG. 2 shows the effect of terrein on growth of seedling height of four potted crops under different treatments according to the present invention. FIG. 3 shows the effect of terrein on fresh weight of four potted crops under different treatments according to the present invention. FIG. 4 shows the effect of terrein on dry weight of four potted crops under different treatments according to the present invention. FIG. 5 shows the effect of terrein on growth of pakchoi under different treatments according to the present invention. FIG. 6 shows the effect of terrein on growth of mung bean under different treatments according to the present invention. FIG. 7 shows the effect of terrein on growth of sorghum under different treatments according to the present invention. FIG. 8 shows the effect of terrein on growth of wheat under different treatments according to the present invention. Among them, in FIGS. 5-8, from left to right: CK (control, 0 µg/mL), terrein seed soaking 2 µg/mL, terrein seed soaking 10 µg/mL, terrein spraying 2 µg/mL, terrein spraying 10 µg/mL mL. The order of marked letters in FIGS. 1-4 is also arranged in this order from left to right. The error bars represent the standard errors of the values, and different lowercase letters (a, b, c, etc.) indicate significant differences according to Fisher's LSD test ($p<0.05$) in FIGS. 1-4.

The normal treatment is watering twice a week, 300 mL each time, 8 times in total, and the soil moisture content is shown in Table 1. The drought treatment is watering once a week, 200 mL each time, four times in total. Table 3 shows the effects of terrein on the growth of each of crops under drought treatment.

TABLE 1

| Watering amount and soil moisture content of crops under normal control treatment | | | | |
|---|---|---|---|---|
| Normal control treatment | pakchoi | mung bean | sorghum | wheat |
| Total watering amount/mL | 2400 | 2400 | 2400 | 2400 |
| Soil moisture content | 18.67% | 18.33% | 19.67% | 19.12% |

TABLE 2

Watering amount, spraying amount and soil moisture content of crops under drought treatment

| | Drought treatment | pakchoi | mung bean | sorghum | wheat |
|---|---|---|---|---|---|
| Soil moisture content | Total watering amount/mL | 800 | 800 | 800 | 800 |
| | Control treatment (0 µg/mLterrein) | 11.00% | 10.00% | 9.33% | 11.67% |
| | 2 µg/mL terrein seed soaking treatment | 11.89% | 10.30% | 10.33% | 9.33% |
| | 10 µg/mL terrein seed soaking treatment | 11.33% | 10.33% | 10.00% | 10.00% |
| | Control treatment (0 µg/mLterrein) | 10.25% | 11.22% | 9.90% | 10.50% |
| | 2 µg/mL terrein spraying treatment | 11.33% | 10.00% | 9.33% | 9.67% |
| | 10 µg/mL terrein spraying treatment | 11.89% | 10.90% | 10.00% | 10.33% |

TABLE 3

Effects of terrein on the growth of each of crops under drought treatment

| Species of crops | Growth index | Control treatment (0 µg/mL terrein) | 2 µg/mL terrein seed soaking treatment | 10 µg/mL terrein seed soaking treatment | Control treatment (0 µg/mL terrein) | 2 µg/mL terrein spraying treatment | 10 µg/mL terrein spraying treatment |
|---|---|---|---|---|---|---|---|
| pakchoi | root length (cm) | 8.75 | 15.46 | 17.43 | 8.75 | 11.59 | 10.19 |
| | seedling height (cm) | 10.55 | 11.45 | 12.21 | 10.55 | 11.40 | 10.73 |
| | fresh weight (g) | 1.74 | 1.91 | 2.45 | 1.74 | 1.75 | 1.85 |
| | dry weight (g) | 0.12 | 0.16 | 0.18 | 0.12 | 0.13 | 0.14 |
| mung bean | root length (cm) | 9.81 | 14.19 | 12.84 | 9.81 | 15.88 | 15.42 |
| | seedling height (cm) | 23.29 | 22.54 | 24.21 | 23.29 | 23.99 | 22.08 |
| | fresh weight (g) | 0.74 | 0.98 | 0.87 | 0.74 | 0.92 | 1.16 |
| | dry weight (g) | 0.12 | 0.15 | 0.16 | 0.12 | 0.14 | 0.15 |
| sorghum | root length (cm) | 32.19 | 35.67 | 33.99 | 32.19 | 38.15 | 42.01 |
| | seedling height (cm) | 40.99 | 40.43 | 39.69 | 40.99 | 39.14 | 38.16 |
| | fresh weight (g) | 1.61 | 1.71 | 1.88 | 1.61 | 1.92 | 1.93 |
| | dry weight (g) | 0.33 | 0.37 | 0.38 | 0.33 | 0.40 | 0.42 |
| wheat | root length (cm) | 15.16 | 16.13 | 18.96 | 15.16 | 17.02 | 25.37 |
| | seedling height (cm) | 20.30 | 21.55 | 20.25 | 20.30 | 18.93 | 20.49 |
| | fresh weight (g) | 0.72 | 1.10 | 1.27 | 0.72 | 1.16 | 1.42 |
| | dry weight (g) | 0.21 | 0.26 | 0.26 | 0.21 | 0.25 | 0.29 |

The present invention has done corresponding indoor petri dish bioassay experiments before, with pakchoi under drought treatment conditions as the recipient plant, terrein as the donor, and the concentration of terrein is set to 0, 2, 10, 50 and 250 µg/mL. The study found that when the concentration of terrein is 2 µg/mL and 10 µg/mL, it could significantly promote the growth of pakchoi, among which, the promotion rates of pakchoi root length are 13.51% and 18.82%, respectively. The promotion rates of pakchoi seedling height are 21.70% and 23.26%, respectively. When the concentration increased to 50 µg/mL, the inhibition rate of pakchoi root length is 16.01%, and the effect on seedling height is not significant. When the concentration reached 250 µg/mL, the inhibitory effect on the growth of pakchoi is further enhanced, and the inhibition rates of its root length and seedling height reached 86.83% and 5.71%, respectively. Therefore, the present invention only selects low concentrations (2 µg/mL, 10 µg/mL) for experiments to confirm the effect of terrein on drought resistance and growth promotion of crops in outdoor pot experiments.

Terrein in the present invention has remarkable promoting effect on pakchoi, mung bean, sorghum, and wheat, especially under drought conditions, and the dosage is extremely small, and can be used as a plant growth regulator in agricultural production. Compared with several other crops, pakchoi has relatively strong sensitivity, and a very small amount can significantly increase its biomass, which can be mainly used to increase the yield of pakchoi. In actual production, terrein has a relatively mature formulation method. It is easily soluble in water, so the formulation method is simple and the operation is convenient. Therefore, the development of terrein as a drought-resistant and growth-promoting agent has high practical value in agricultural production.

Finally, it should be noted that the above embodiments are merely the preferred embodiments of the present disclosure, and are not intended to limit the present disclosure. Any modifications, equivalent substitutions and improvements made within the spirit and principles of the present disclosure should be included in the protection of the present disclosure within the scope.

What is claimed is:

1. A treatment method for drought resistance and growth promotion of crops, comprising:

preparing a biopesticide formulation containing terrein as an active ingredient with distilled water or biopesticides; and performing a seed soaking treatment or a spraying treatment on the crops with the biopesticide formulation;

wherein IUPAC name of the terrein is (4S,5R)-4,5-Dihydroxy-3-[(E)-prop-1-enyl]cyclopent-2-en-1-one;

wherein structural formula of the terrein is wherein the concentration of the terrein in the biopesticide formulation ranges from 2 μg/mL to 10 μg/mL;

wherein the crops are pak choi, mung bean, sorghum, or wheat.

2. The treatment method for drought resistance and growth promotion of the crops according to claim 1, wherein the seed soaking treatment comprises: soaking the seeds of the crops in the biopesticide formulation for 2 to 8 hours, and then sowing them for cultivation.

3. The treatment method for drought resistance and growth promotion of crops according to claim 2, wherein the seed soaking treatment comprises: soaking the seeds of the crops in the biopesticide formulation for 6 hours.

4. The treatment method for drought resistance and growth promotion of crops according to claim 1, wherein the spraying treatment comprises: spraying the biopesticide formulation at a seedling stage of the crops 1 to 3 times.

* * * * *